US005332602A

United States Patent [19]

Barré et al.

[11] Patent Number: 5,332,602

[45] Date of Patent: Jul. 26, 1994

[54] SYNTHETIC WOOD BOARD

[76] Inventors: Guy Barré, 250 Beaconsfield Blvd., Beaconsfield, Quebec, Canada, H9W 4A5; Rémi Vigneault, 2500 Avenue Pierre-Dupuis, Montreal, Quebec, Canada, H3C 4L1

[21] Appl. No.: 57,890

[22] Filed: May 7, 1993

Related U.S. Application Data

[62] Division of Ser. No. 787,123, Nov. 4, 1991, Pat. No. 5,271,699.

[51] Int. Cl.[5] .......................... B32B 3/06; B32B 3/08

[52] U.S. Cl. .................................... 428/99; 428/106; 428/151; 428/60; 52/785

[58] Field of Search ..................... 428/99, 58, 60, 106, 428/151; 52/588, 785

*Primary Examiner*—Alexander S. Thomas

[57] ABSTRACT

A synthetic wood board comprised of an extrusion of plastics material having opposed elongated top and bottom flat parallel walls spaced apart by transverse walls. A wood grain simulation pattern is formed in at least one of the top or bottom surfaces of the board. Two of the transverse walls are end walls, and each have integrally formed elongated connectors which interconnect with connectors of an adjacent one of the synthetic wood boards. A central fastener receiving channel extends longitudinally in the top and bottom walls and aligned back to back. A transverse wall is provided on each side of the fastener receiving panel. The fastener receiving channel of at least the top wall is provided with a cover strip which is removably connectable across a top opening thereof to conceal fastener heads of fasteners secured therein.

6 Claims, 5 Drawing Sheets

SYNTHETIC WOOD BOARD

This application is a division of U.S. patent application Ser. No. 07/787 123 filed Nov. 4, 1991 now U.S. Pat. No. 5,271,689.

TECHNICAL FIELD

The present invention relates to a synthetic wood board formed from extruded plastics material having a wood grain simulation pattern formed in at least one of the top or bottom surfaces thereof with the boards being interconnected side by side by connectors formed in opposed side walls of the board.

BACKGROUND ART

It is known in the art to produce synthetic articles or boards having a wood imitation on one or more surfaces thereof. It is particularly desirable to utilize these products as substitutes for wood in areas where wood can deteriorate quickly due to its environment, such as when used in a ground surface or in contact with water. Another advantage of using synthetic lumber over wood is that there is less maintenance required in keeping a synthetic lumber surface clean and in most instances, the synthetic lumber does not require painting. Another advantage is that synthetic lumber will not warp nor shed sap nor have knots as is the case with lumber and these knots often result in damage to the surface of the lumber which becomes an eyesore. The running of sap is also an eyesore and an inconvenience.

Processes for the production of synthetic lumber and a wood grain imitation are, for example, described in U.S. Pat. No. 3,936,518 and 4,141,944. In one of these patents, there is disclosed an extrusion process wherein a formable resin is extruded through a die having an orifice with recesses or grooves around its periphery to form an article having peaks and valleys on its surfaces and while the article is still soft, these peaks are pressed to form portions having high and low densities resulting in a pattern which resembles natural wood. In the other process, the production of the wood imitation is produced by heating a densified covering layer of the workpiece and then relief embossing texture furrows in portions of the densified covering layer. This type of process is usable for producing articles made only with a synthetic resin having a higher density outer core than the inner core. It is also known to apply an adhesive vinyl on articles, be it plastics or metal, with a pattern printed on the vinyl. It is further known to paint a wood grain imitation on synthetic material or metal, etc.

A further disadvantage of the synthetic lumber above-described having a wood grain imitation thereon is that the surface of the lumber is always relatively smooth. This can be a disadvantage when using the lumber as a flooring, as the plastics material is very slippery in its nature, and this can cause people to slip and injure themselves.

SUMMARY OF INVENTION

A feature of the present invention is to provide a synthetic wood board having a wood grain simulation pattern on at least a surface thereof and wherein the boards are interconnectable side by side by connectors formed in the side walls thereof.

According to a broad aspect of the present invention there is provided a synthetic wood board comprised of an extrusion of plastics material having opposed elongated top and bottom flat parallel walls spaced apart by transverse walls. A wood grain simulation pattern is formed in at least one of the top or bottom surfaces of the board. Two of the transverse walls are end walls, and each have integrally formed elongated connectors which interconnect with connectors of an adjacent one of the synthetic wood boards. A central fastener receiving channel extends longitudinally in the top and bottom walls and aligned back to back. A transverse wall is provided on each side of the fastener receiving panel. The fastener receiving channel of at least the top wall is provided with a cover strip which is removably connectable across a top opening thereof to conceal fastener heads of fasteners secured therein.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
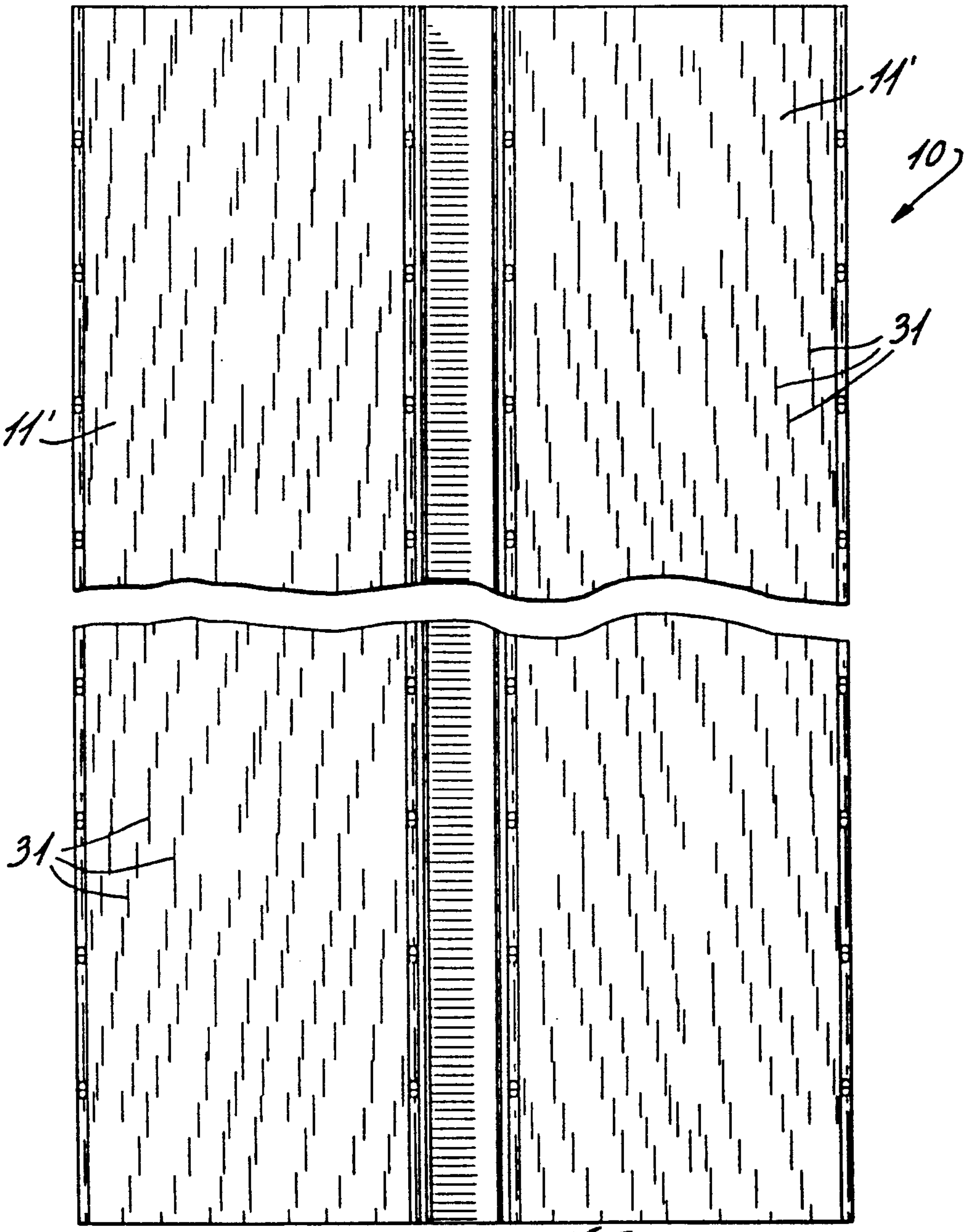
FIG. 1 is a top view of a synthetic wood board constructed in accordance with the present invention.
Figure 2:
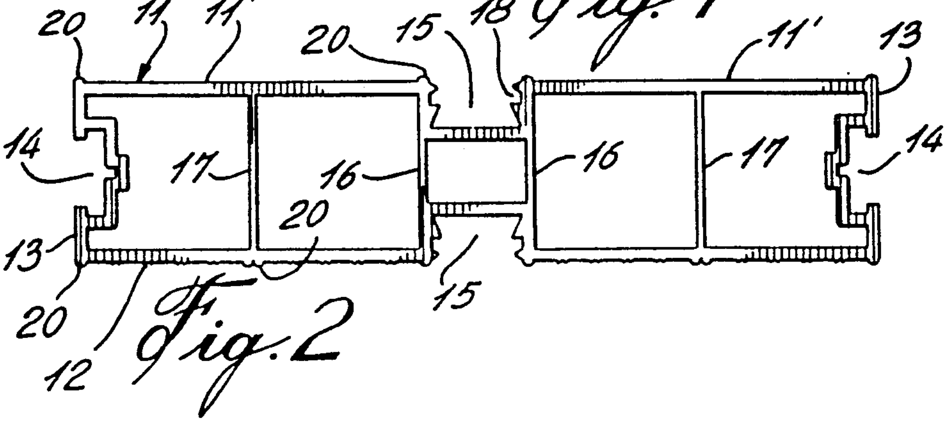
FIG. 2 is an end view of FIG. 1.
Figure 3:
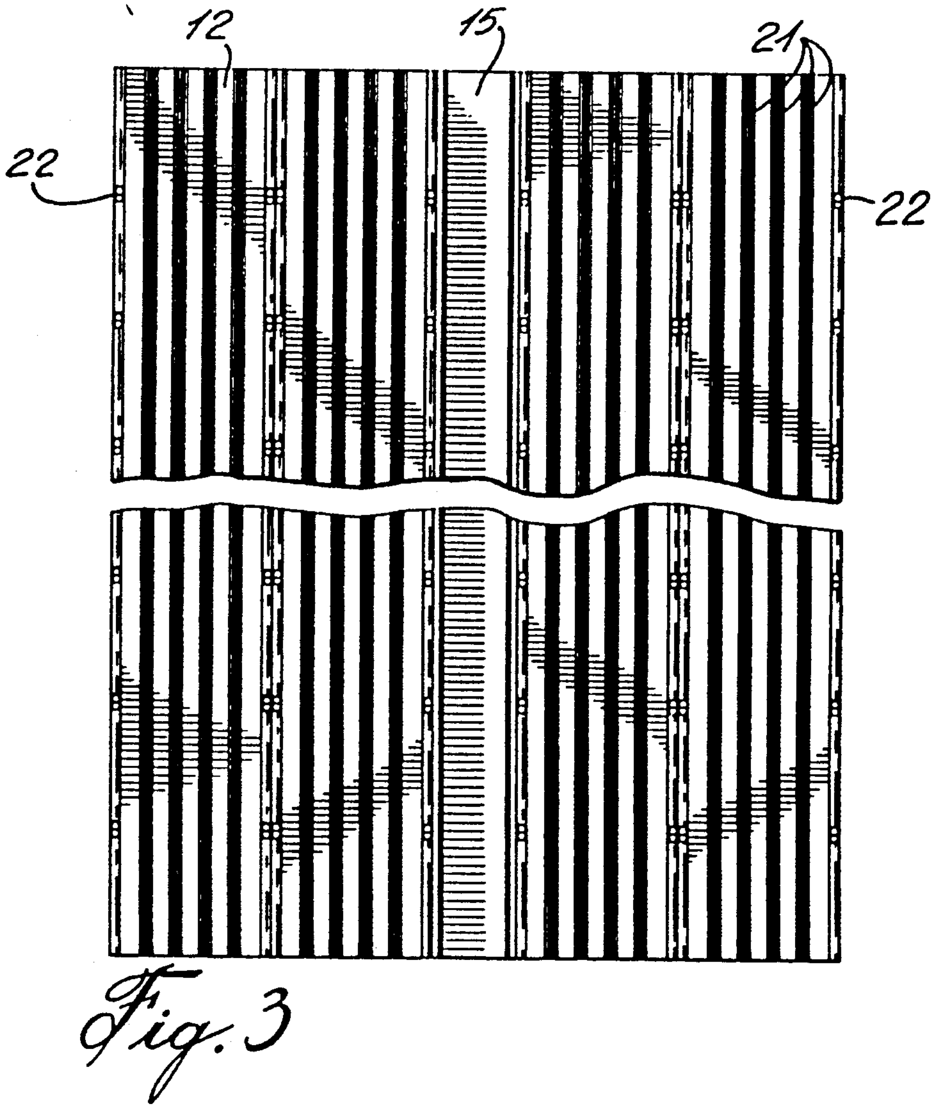
FIG. 3 is a bottom view of FIG. 1.
Figure 4:
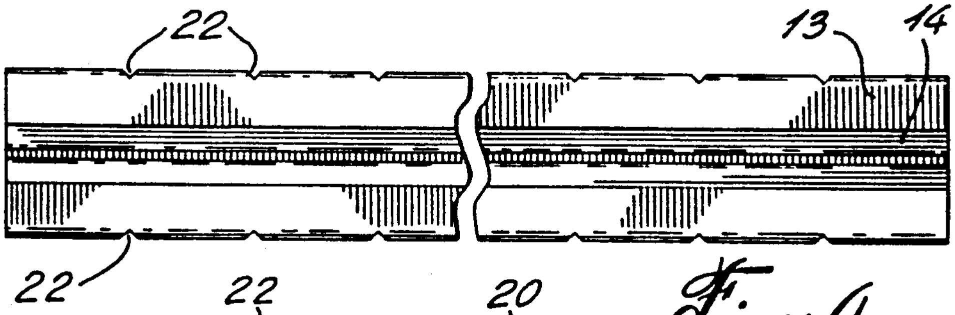
FIG. 4 is a side view of FIG. 4.
Figure 5:
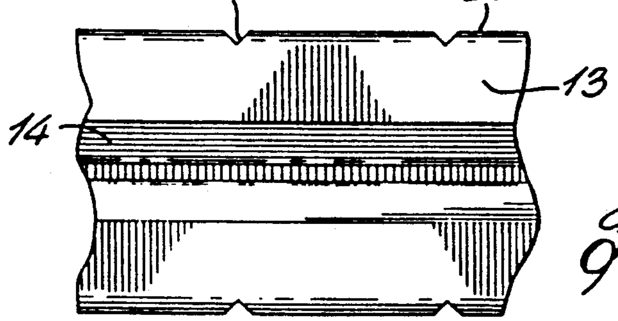
FIG. 5 is an enlarged view of FIG. 4.
Figure 6:
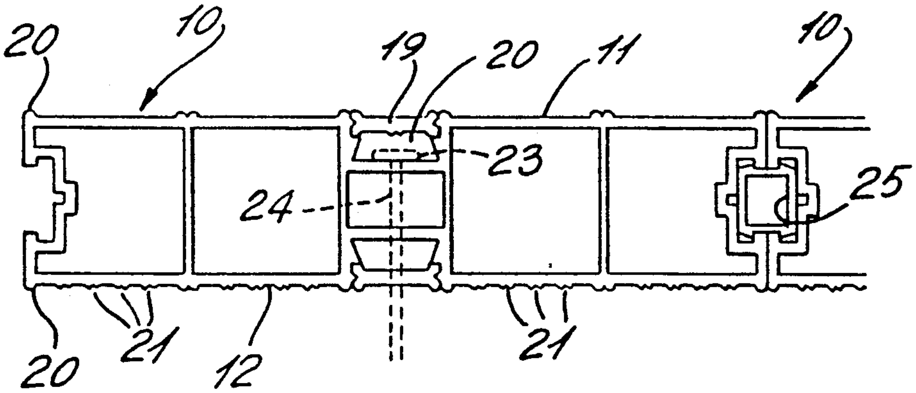
FIG. 6 is an end view showing two synthetic boards interconnected together.

Referring now to the drawings, and more particularly to FIGS. 1 to 7C, there is shown generally at 10, a synthetic wood board constructed in accordance with the process of the present invention. As better shown in FIGS. 2 and 7A to 7C, the wood board is comprised of an extrusion of plastics material and has opposed elongated top and bottom flat parallel walls 11 and 12 and which are maintained spaced apart by transverse connecting walls. The connecting walls consist of two transverse end walls 13 having an elongated channel connector 14. A central fastener receiving channel 15 extends longitudinally in the top and bottom walls 11 and 12 and are aligned back to back with one another. A transverse wall 16 is provided on each side of the receiving channels and a further transverse wall 17 reinforces the opposed wall portions 11 and 12 on each side of these channels 15. The channels 15 are provided with longitudinal grooves 18 on opposed sides thereof adjacent a top edge to retain therein a cover strip 19, as shown in FIG. 6. Longitudinal ribs 20 are also disposed on the top walls and bottom walls 11 and 12. Further anti-skid ribs 21 may be provided on one of these surfaces, as shown in FIG. 3 on the bottom surface 12, should it be desired to have a skid-resistant surface.

Notches 22 may also be formed in the ribs 20 to provide an anti-skid feature. These are better shown in FIG. 5.

As shown in FIG. 6, the cover strips 19 are provided over the channels 15 to conceal the heads 23 of fasteners 24 which are used to secure the board onto a support material (not shown) but obvious to a person skilled in the art. The boards 10 are also interconnected together along their longitudinal edges by a connector strip 25 which is snap-fitted within the connector channels 14. This prevents the boards from buckling along their mated edges and channels water infiltration towards an end of the board. The boards are also reversible and may have a different pattern on opposed sides, as shown in FIGS. 1 and 3.

Figure 7A:
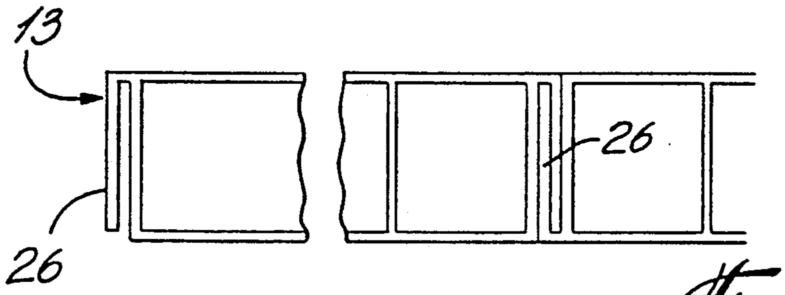
FIGS. 7A, 7B and 7C are fragmented end views showing various types of side wall connectors for interconnecting boards together.
Figure 7B:
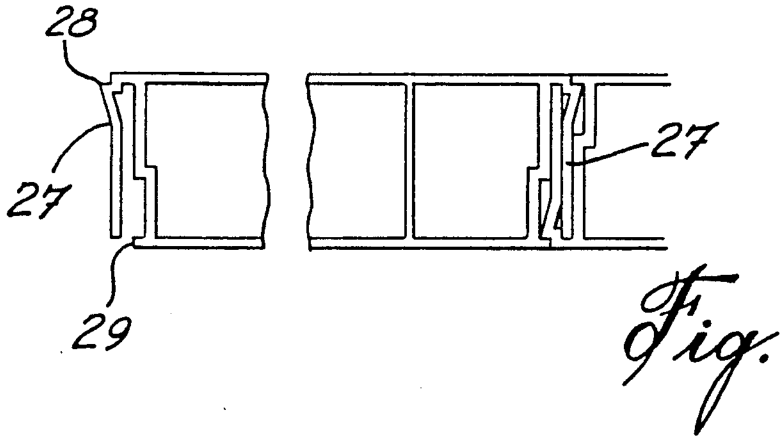
Figure 7C:
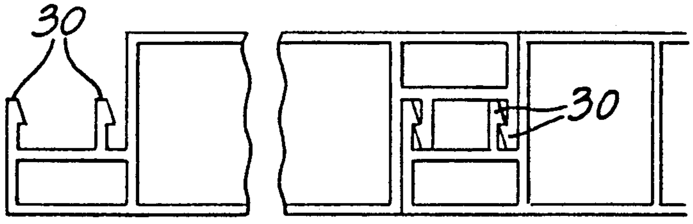

FIGS. 7A through 7C show different types of connectors that may be formed in the end walls 13 of the board. As shown in FIG. 7A, the end wall 13 may be provided with a depending edge flange 26 spaced from the end wall for frictional mating with an inverted edge flange 26 of an adjacent board. FIG. 7B shows an inverted edge flange 27, but having a different configuration with a snap lock notch 28 formed in a corner thereof to engage with a ledge 29 when the flanges 27 of adjacent boards are mated to interlock. FIG. 7C shows a further interlocking flange design wherein vertically oriented locking fingers 30 extend upwardly along a horizontal wall extension formed in opposed edges of the board, and inverted from one another, and in a manner to interlock as shown.

Figure 12:
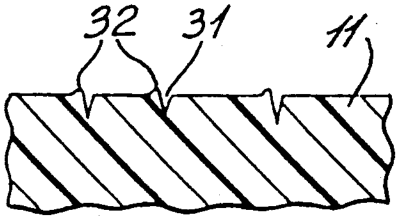
FIG. 12 is an enlarged section view in the surface of a synthetic board having slits cut therein.

As shown in FIG. 1, one of the surfaces of the board, herein the top surface 11, is formed with a wood grain simulation pattern. The wood grain simulation pattern is comprised of a plurality of short slits 31 cut within the surface, as illustrated in FIG. 12, so as to displace the material to form short peaks 32 which produce an anti-slip surface and also produce a slightly roughened surface simulating rough grain which can be felt when the hand is passed on the surface of the board. These slits extend along the longitudinal axis of the board and are spaced laterally from one another and in an offset pattern to simulate a wood grain. The slits 31 may be of equal or different lengths.

Figure 10A:
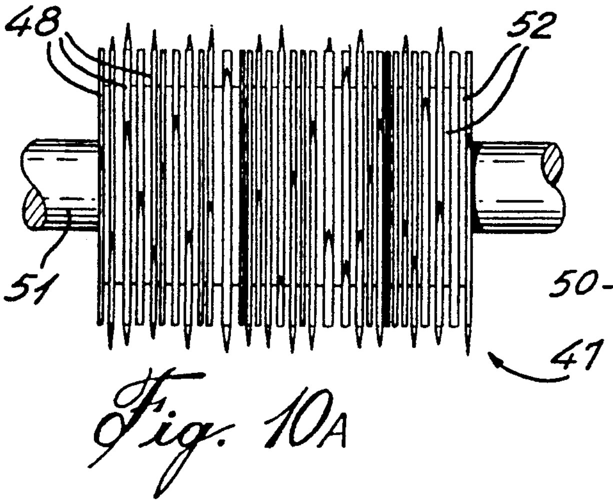
FIG. 10A is an enlarged view of the cutting device.
Figure 10B:
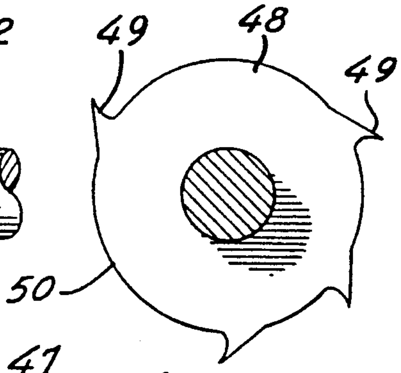
FIG. 10B is a plan view illustrating the construction of the cutting blades.
Figure 11:
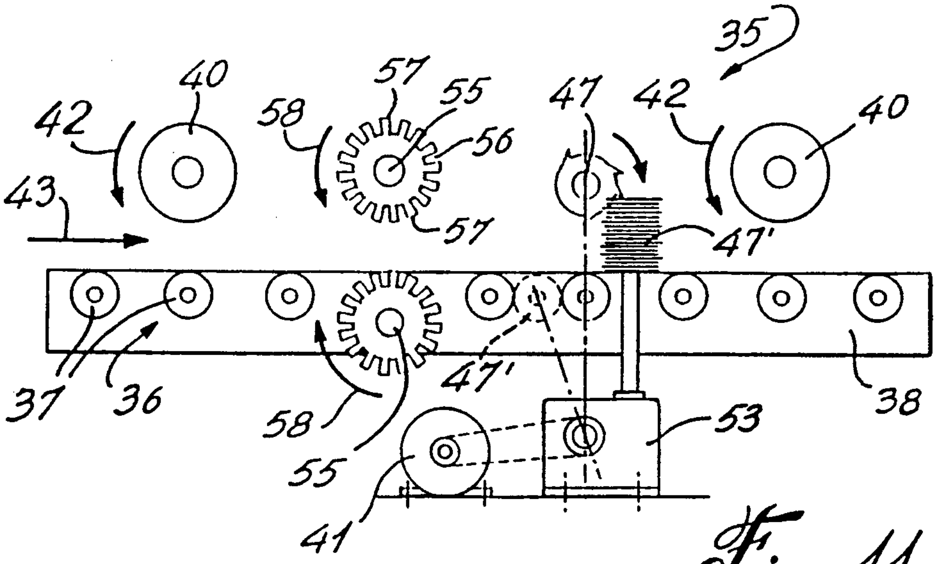
FIG. 11 is a view similar to FIG. 8 but showing the drive coupling.

Referring now to FIGS. 8 through 11, there will be described the process and apparatus for forming the wood grain simulation pattern 31 on synthetic boards, as shown in FIG. 1, or other articles, such as aluminum extrusions, press-wood products, etc. The apparatus is generally shown at 35 in FIGS. 8 and 9 and it comprises a support roller conveyor 36 having a plurality of conveyor roll cylinders 37 freely rotatable between a pair of side frames 38 and defining a conveyor support surface 39 on a top side thereof. A pair of traction rollers 40 having a non-marking, non-slip outer covering are adjustably spaced a predetermined distance above the conveyor support surface 39. Although not shown, these traction rollers are supported on frames to be adjustable vertically dependent on the width of the article to be conveyed on the support surface 39. The traction rollers 40 are coupled to a drive motor 41, as shown in FIG. 11, whereby the rollers 40 are rotated in the direction, as illustrated by arrows 42, to advance a board, such as the board 10, over the conveying surface in the direction of arrow 43. Guide means in the form of adjustable guide flanges 44 may be positioned along the conveyor to guide the article along a predetermined path. As herein shown, the guide flanges 44 are mounted on a threaded guide bolt 45 which is actuable by opposed end connectors 46 to displace the guide flanges 44 to their proper positions depending on the width of the board to be processed. Alternatively, the boards can be guided along a predetermined path by the hands of an operator(s).

Intermediate the traction rollers 40, there is disposed a rotatable cylinder 47 which is formed, as shown in FIGS. 10A and 10B, of a plurality of cutting discs 48 having one or more cutting blades 49 extending about the periphery thereof. These blades 49 are cutting fingers spaced apart a variable distance from one another whereby the slits 31 formed by a complete rotation of each of the cutting discs 48 are spaced apart a variable distance from one another to form staggered slits. As shown in FIG. 10A, some of the cutting discs 48 may also be of a different thickness to form slots that vary in width to provide a better simulation of the wood grain. Furthermore, the cutting blades 49 may project from the outer periphery 50 of the discs a different distance to form slits that are longer or shorter from one another. The cutting fingers are pointed to displace material to form ridges 32, as shown in FIG. 12.

As shown in FIG. 10A, the discs 48 are supported on a drive shaft 51 and are maintained spaced apart by spacers 52. The drive shaft 51 is coupled to the motor 41 directly or through a clutch 53, as shown in FIG. 11. The clutch 53 would permit the drive shaft 51 having the cutting discs thereon to be driven at a slower or faster speed than the traction rolls to produce slits of different lengths within the top surface of the material conveyed on the support surface 39. As shown in FIG. 11, a further cylinder having cutting discs 48' may also be mounted in the plane of the conveyor cylinders 37 to cut wood simulation slits into the bottom surface of the article being conveyed on the support surface 39.

Figure 8:
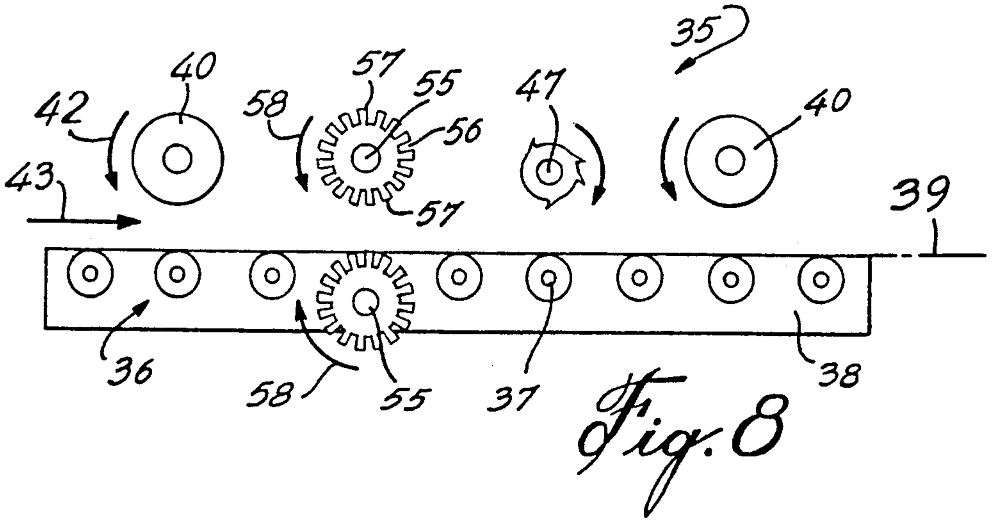
FIG. 8 is a schematic view showing the apparatus for carrying out the process of the present invention.
Figure 9:
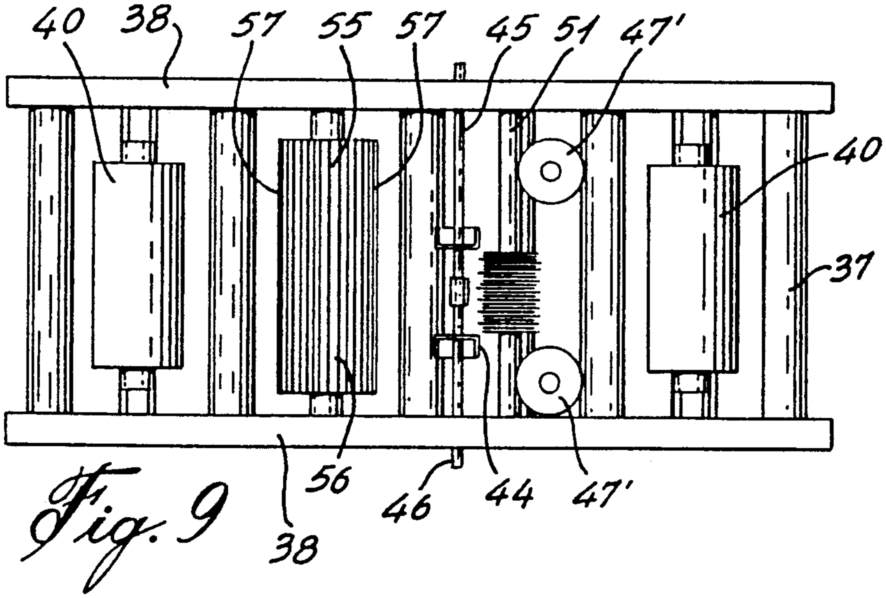
FIG. 9 is a top view of FIG. 8.

Referring now to FIGS. 8 and 9, it can be seen that notch forming cylinders 55 are also disposed in proximity of the top and bottom surface of the board being conveyed on the support surface 39 and these are also adjustable vertically. These notch forming cylinders 55 have a plurality of longitudinal slots 56 provided in the outer surface thereof and in selected ones of which there is inserted a blade 57 having a cutting edge or a blunt edge to form the anti-skid notches 22 in the longitudinal ribs 20 provided on the top and bottom surfaces of the board 10, as shown in FIGS. 1 and 2. The notch forming cylinders 55 are rotated in the direction of arrows 58 and are also driven by the drive motor 41. As shown in FIG. 11, the traction rollers 40, the notch forming cylinders 55 and the cutting discs 48 are all coupled to a common drive motor with the cutting discs being rotated in a counter-direction as the rollers and cylinders.

Briefly summarizing the process of the present invention, articles such as the board 10, shown in FIGS. 1 and 2, are fed on the conveyor support surface 39 by the traction rollers 40 and short slits are made in the top surface thereof by the cylinder 47 formed of cutting discs 48 which are spaced apart therealong to cut short slits in the surface which extend along the feed axis of the article and spaced laterally from one another and in an offset pattern, as shown in FIG. 1. The slits may also be of different lengths and widths and this can be controlled by making the cutting blades longer from one another or else controlling the speed of the cutting cylinder 47 with respect to the drive speed of the plank. Although only one cutting cylinder 47 is herein shown for the board, as shown in FIG. 1, there would be two cylinders 47 provided to cut each top surface portion 11', as shown in FIG. 1. Transverse cutting cylinders 47' may also be positioned to each side of the feed path of the article conveyed on the conveyor support surface 39 to impart slits in side walls of a synthetic article conveyed if a wood simulation was desirable on the side walls of the article as well as on the top and bottom walls. These vertical cylinders would also be adjustable widthwise of the conveyor surface and constructed in the same fashion as the cylinder 47 shown in FIG. 10A.

It is within the ambit of the present invention to cover any other obvious modifications of the preferred embodiment described herein provided such modifications fall within the scope of the appended claims.

We claim:

1. A synthetic wood board comprising an extrusion of plastics material having opposed elongated top and bottom flat parallel walls spaced apart by transverse walls, a wood grain simulation pattern formed in at least one of said top and bottom flat parallel surfaces, two of said transverse walls being end walls, each said end walls having integrally formed elongated connector means which interconnect with connector means of an adjacent one of said synthetic wood boards, a central fastener receiving channel extending longitudinally in said top and bottom walls and aligned back to back, a transverse wall on each side of said fastener receiving channel, said fastener receiving channel of at least said top wall has a cover strip removably connectable across a top opening thereof to conceal fastener heads of fasteners secured therein.

2. A synthetic wood board as claimed in claim 1 wherein there is further provided two or more elongated ribs extending above a top surface of said top and bottom walls and having anti-skid notches therein.

3. A synthetic wood board as claimed in claim 2 wherein said elongated connector means is a channel connector formed in said end walls, and a connector strip engageable with channel connectors of opposed end walls of a pair of synthetic boards positioned side by side to interconnect said pair of synthetic boards.

4. A Synthetic wood board as claimed in claim 2 wherein said elongated connector means is a depending edge flange spaced from said end wall for frictional mating with an edge flange of an adjacent inverted one of said boards, said boards having said wood grain simulation pattern formed on both said top and bottom surfaces.

5. A synthetic wood board as claimed in claim 4 wherein said depending edge flange is provided with a snap lock notch formed in a corner thereof to engage with a ledge when said flanges of adjacent boards are mated to interlock.

6. A synthetic wood board as claimed in claim 2 wherein said elongated connector means is an interlocking horizontal wall extension formed in said end walls of said board and extending flush with a respective one of said top and bottom surfaces, vertically oriented locking fingers extending transverse of a rear face of said wall extensions and inverted from one another for interlocking when mated together.

* * * * *